(12) United States Patent
Du et al.

(10) Patent No.: US 9,148,816 B2
(45) Date of Patent: Sep. 29, 2015

(54) DYNAMIC RATE CONTROL IN WIFI SYSTEMS

(71) Applicant: QUALCOMM Incorporated, San Diego, CA (US)

(72) Inventors: Shu Du, Milipitas, CA (US); Zhanfeng Jia, Belmont, CA (US); Chin-Hung Chen, San Jose, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 13/921,860

(22) Filed: Jun. 19, 2013

(65) Prior Publication Data

US 2014/0269655 A1    Sep. 18, 2014

Related U.S. Application Data

(60) Provisional application No. 61/785,833, filed on Mar. 14, 2013.

(51) Int. Cl.
| | | |
|---|---|---|
| *H04W 28/02* | (2009.01) | |
| *H04L 1/00* | (2006.01) | |
| *H04L 5/00* | (2006.01) | |

(52) U.S. Cl.
CPC ......... *H04W 28/0231* (2013.01); *H04L 1/0003* (2013.01); *H04L 1/0009* (2013.01); *H04L 1/0016* (2013.01); *H04L 5/006* (2013.01); *H04L 5/0023* (2013.01); *H04L 5/0046* (2013.01)

(58) Field of Classification Search
None
See application file for complete search history.

(56) References Cited

U.S. PATENT DOCUMENTS

| | | | |
|---|---|---|---|
| 7,369,510 B1* | 5/2008 | Wong et al. | 370/252 |
| 2006/0188035 A1 | 8/2006 | Tzannes | |
| 2007/0206695 A1* | 9/2007 | Ye et al. | 375/267 |
| 2009/0268833 A1 | 10/2009 | Ariyavisitakul et al. | |
| 2011/0059765 A1 | 3/2011 | Kim et al. | |
| 2012/0033618 A1 | 2/2012 | Wallace et al. | |
| 2012/0076219 A1 | 3/2012 | Srinivasa et al. | |
| 2012/0082122 A1 | 4/2012 | Trainin | |

FOREIGN PATENT DOCUMENTS

WO    2012041972 A1    4/2012

OTHER PUBLICATIONS

ISA/EPO, International Search Report and Written Opinion of the International Searching Authority, Int'l App. No. PCT/US2014/020124, Jun. 6, 2014, European Patent Office, Rijswijk, NL, 10 pgs.

* cited by examiner

*Primary Examiner* — Kodzovi Acolatse
(74) *Attorney, Agent, or Firm* — Holland & Hart LLP

(57) ABSTRACT

A wireless device is configured to switch data rates to account for temporary channel conditions or device configuration errors. Pre-selected data rates, more likely to achieve maximum goodput, are stored in a data rate table. The data rate table contains candidate data rates for each pre-selected data rate in the data rate table. When probe transmissions using the preselected data rates fail, dynamic rate probing is utilized to determine a possible cause and extent of the problem. The dynamic rate probing scheme transmits probe transmissions using the candidate data rates and tracks success or failure of these probe transmissions. An analysis of the probe transmissions is used to indicate a possible cause and/or extent of the problematic condition and to determine whether there is a need to reconfigure the data rates in the data rate table.

18 Claims, 8 Drawing Sheets

DYNAMIC RATE CONTROL IN WIFI SYSTEMS

RELATED APPLICATION

This application claims priority under 35 U.S.C. §119(e) to U.S. Provisional Application Ser. No. 61/785,833, entitled "Dynamic Rate Control In WiFi Systems", filed on Mar. 14, 2013, which is herein incorporated by reference in its entirety.

BACKGROUND

Field of the Invention

The IEEE 802.11 standards are used to formulate wireless local area networks (WLAN) within a radio frequency (RF) band by specifying a communication protocol that attempts to achieve the maximum data rate. The IEEE 802.11 standard provides for multiple data rates at the physical (PHY) layer. A data rate is identified by a modulation and coding scheme (MCS) index. Each MCS index value is associated with various parameters, such as the number of the spatial streams, Nss, (e.g., 1-4), the choice of guard intervals (e.g., short or long), channel bandwidth (e.g., 20 MHz, 40 MHz, 80 MHz, 160 MHz), modulation type (e.g., BPSK, QPSK, 16-QAM, 64-QAM, 256-QAM), and coding rate (e.g., ½, ¾, ⅚, ⅔). The data rate associated with a MCS index is based on specific settings of the parameters. There are numerous MCS index values where each MCS index value represents a different combination of the various settings of the parameters. However, the data rates indicated by the MCS index value do not account for the real word dynamics of a wireless network which suffer from conditions, such as link failures, random channel errors, link budget, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A wireless device is configured to switch data rates to account for temporary channel conditions or device configuration errors. A wireless network may suffer from poor link budget, random channel errors, link failures, and the like. A wireless device may have been configured with an incorrect number of spatial streams or experience real time failures of one of its many antennas, thereby reducing the number of spatial streams the device can support. When these conditions are detected, a dynamic rate probing technique is used to determine a data rate that can compensate for these conditions.

A data rate is identified based on a MCS index value. Each MCS index value is associated with a fixed number of spatial streams, Nss, and a modulation and coding (MCS) type. When using a non-dynamic rate probing technique, a linear data rate table is configured with pre-selected data rates that are associated with a particular MCS type and number of spatial streams, Nss. These rates in the linear rate table are usually just a subset of all the supported rates. This subset of data rates are selected into the linear data rate table because they are more likely to achieve maximum goodput than other supported rates which are not in the linear rate table at any given channel conditions, wherein goodput is defined as the ratio of the expected delivered data payload to the expected transmission time. Therefore, during a rate selection procedure, one only needs to select a rate from the linear rate table, ignoring all the other supported rates. Since the number of rates in the linear rate table is usually much smaller than the number of all supported rates, picking a rate from the linear rate table becomes much simpler and more straightforward than picking a rate from all supported rates. However, at times, probe transmissions using the preselected data rates in the linear rate table may not achieve the better goodput than a rate that is not in the linear rate table, thereby indicating a problem within the wireless network which may be attributable to various conditions that may be temporary or long lasting. In this case, a dynamic rate probing technique is used to determine a possible cause and the extent of the problem.

The dynamic rate probing technique transmits probe transmissions using data rates associated with Nss and MCS values outside of the linear data rate table. The success or failure of the probe transmissions using these alternative candidate data rates, which are not in the original linear rate table, is tracked. An analysis of the tracked probe transmissions is used to determine whether or not the data rates in the data rate table need to be reconfigured. In the event some of the probe transmissions using the alternative candidate data rates succeed, the problem may be semi-permanent thereby necessitating a need to reconfigure the original linear data rate table with the successful alternate data rates.

At a later point in time, the once-unsuccessful data rates in the original linear rate table may be re-probed and if successful, the data rate table may be reconfigured with the data rates from the original configuration. When all probe transmissions using the alternative candidate data rates fail, a temporary problem may exist and the data rate table is left intact. At a later time, the dynamic rate probing technique may be utilized again to re-analyze the channel conditions.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Figure 1:
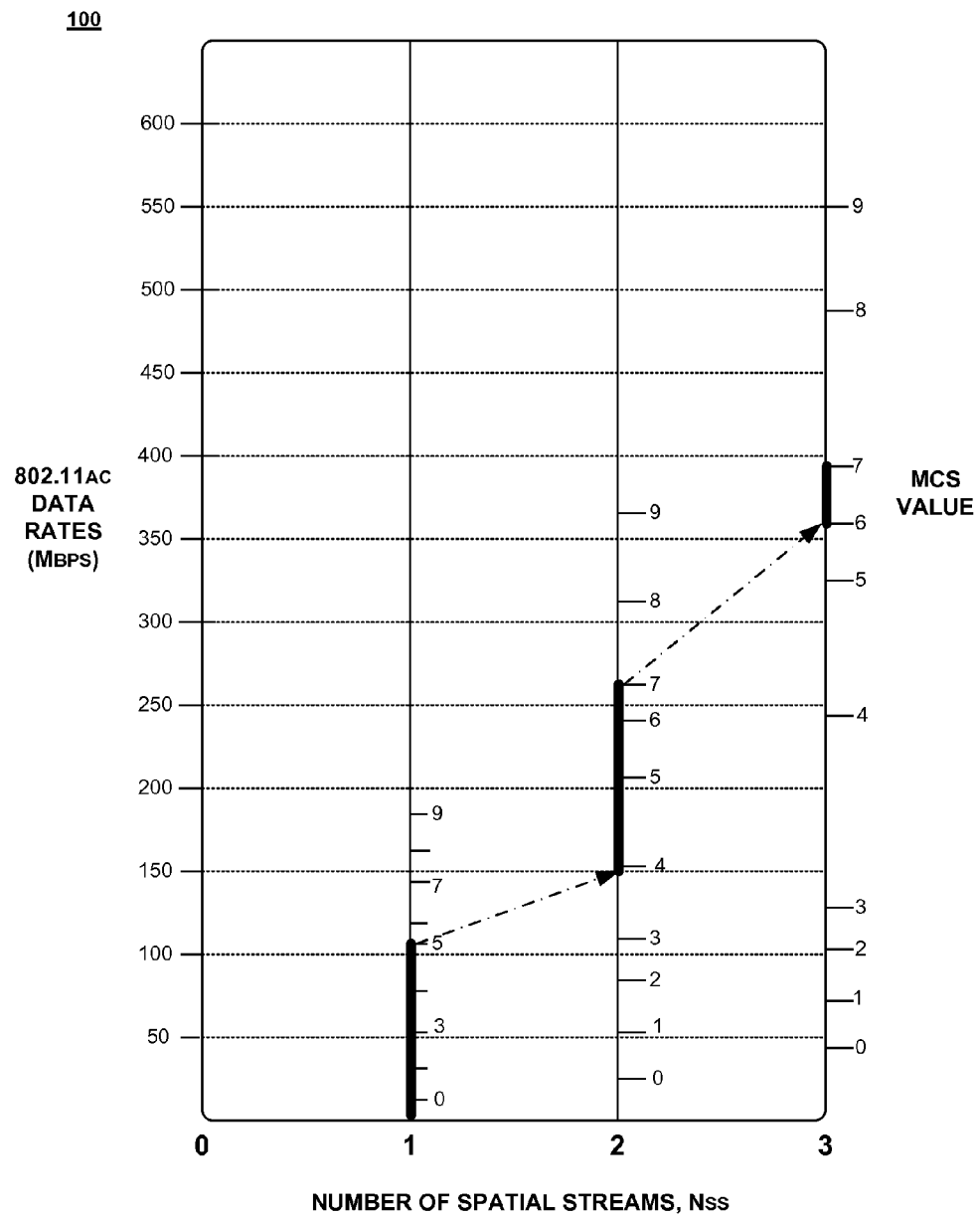
FIG. 1 is a graph illustrating an exemplary linear rate table with pre-selected data rates represented by an Nss and a MCS value.

The various embodiments pertain to a dynamic rate adaption technique that dynamically probes for a data rate based on the number of spatial streams and a modulation and coding scheme in order to adjust to current channel conditions and device configuration errors. A wireless device may have been configured with an incorrect number of spatial streams or experience real time failures of an antenna, thereby reducing the number of spatial streams the device can support. The wireless network may suffer from varying channel conditions, such as poor link budget, random channel errors, link failures, and the like.

The media access control (MAC) layer is configured to dynamically select a rate to achieve maximum throughput based on the current channel conditions. Rate adaption is a technique that determines a data rate by estimating the channel quality and altering the transmission parameters to adjust to the current channel conditions. The variations in the wireless medium may be short-term or long-term depending on the nature of the channel condition. The effectiveness of the rate adaption technique relies on the best values used to set the data rate.

In order to determine the data rate that will achieve the best goodput at a specific time, the current channel conditions need to be accessed. Goodput is the ratio of the expected delivered data payload to the expected transmission time. Probe packets are transmitted from a transmitter using pre-selected data rates designed to cover typical and predicted channel conditions. A probe packet uses a MCS index value that is associated with a particular number of spatial streams, a particular modulation and coding scheme, and a data rate. The pre-selected data rates stored in a data rate table are identified by a number of spatial streams, Nss, and a number indicating the type of modulation and coding scheme used.

Transmission success is indicated by an acknowledgement (ACK) or block acknowledgement (BA) sent back to the transmitter or by the packet error rate (PER) being less than a threshold, for example, 50%. Failure is detected by the lack of the ACK or by the PER exceeding a 50% threshold. The failure of achieving the maximum data rate set in the linear data rate table results in the probing being stuck. As described in more detail below, the probing may become stuck at any of the data rates in the linear data rate table.

The pre-selected data rates in the linear data rate table are chosen based on offline simulations as well as over-the-air verification testing. However, the data rates in the data rate table may not be suitable for all environments. In some environments, a wireless device may be mis-configured or temporarily misplaced, making the data rate values specified in the data rate table useless. For example, a wireless device may have two of its three antennas broken or non-operational causing the device to be effectively downgraded to a 1×1 device (i.e., 1 receive antenna/receive chain and 1 transmit antenna/transmit chain). If the data rate table is configured with incorrect data rates, even temporarily, the consequences to the performance of the wireless network can be detrimental since data rates not in the data rate table are not considered. For example, in the case of a misconfigured 3×3 device (i.e., 3 receive antennas/receive chains and 3 transmit antennas/transmit chains) that is physically only capable of operating as a 1×1 device, some of its supported one spatial-stream data rates may not be in the misconfigured data rate table, since these 1×1 rates won't give the optimal goodput for an operational 3×3 device. For example, the rates of 256-QAM with Nss=1 cannot be used by this misconfigured device as the originally configured rate table was optimized for 3×3 devices not for 1×1 devices.

FIG. 1 illustrates an exemplary data rate graph showing data rate values, where each data rate value is configured as a combination of a number of spatial streams, Nss and a MCS type. Each pair in the linear rate table corresponds to a data rate having been pre-selected as being most likely to achieve the best goodput at a given channel condition. The pairs may be selected from offline simulation studies of the traffic pattern and behavior of a wireless network under varying conditions. As shown in FIG. 1, the following pairs have been pre-selected into the linear rate table where each pair is of the format (number of spatial streams/Nss, MCS type): (1,0); (1,1); (1,2); (1,3); (1,4); (1,5); (2,4); (2,5); (2,6); (2,7); (3,6); and (3,7). The pre-selected pairs may be included in a data rate table for use in analyzing current channel conditions. The following pairs have not been selected and are not included in the data rate table shown in FIG. 1: (1,6); (1,7); (1,8); (1,9); (2,0); (2,1); (2,2); (2,3); (2,8); (2,9); (3,0); (3,1); (3,2); (3,3); (3,4); (3,5); (3,8); (3,9).

The probe packets may be transmitted in a sequential order that starts with the lowest spatial stream and proceeds to the highest spatial stream. For example, as shown in FIG. 1, the probe transmissions would follow the following order: (1,0)-(1,5), (2,4)-(2,7), (3, 6)-(3,7). At times, a failure in a probe transmission may occur when an ACK is not returned or the performance threshold is not met (e.g., packet error rate (PER) being less than a 50% threshold) (collectively, "threshold criteria").

Figure 2:
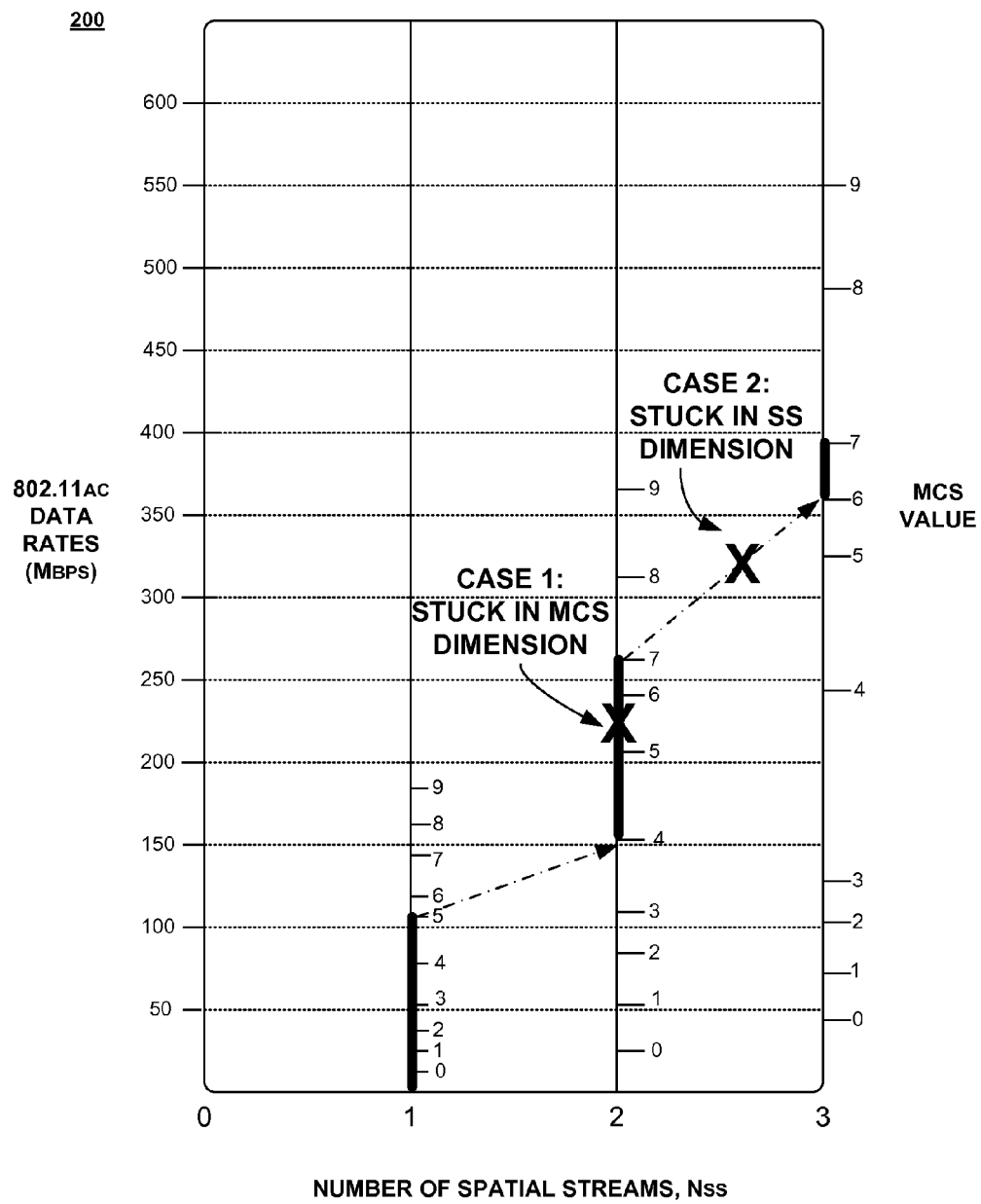
FIG. 2 is a graph illustrating two cases where probing is stuck from achieving a higher data rate.

FIG. 2 illustrates two cases of such failures with the data rate, Nss, and MCS values shown in FIG. 2. A failure may occur when probing a higher data rate within the MCS dimension which is shown in FIG. 2 as Case 1. In Case 1, probing at (2, 6) resulted in the probe process stuck at (2, 5) when attempts to probe at the higher MCS dimension failed. A failure in this case may be caused by a temporary condition such as link budget or channel correlation. A failure may also occur when probing a higher data rate with the spatial stream dimension which is shown in FIG. 2 as Case 2. In Case 2, probing at (3,6) resulted in the probe process stuck at (2, 7) failing to achieve a higher data rate within the next spatial stream. A failure in this case may be caused by a temporary condition such as link budget or channel correlation or caused by a semi-permanent device configuration error.

Figure 3:
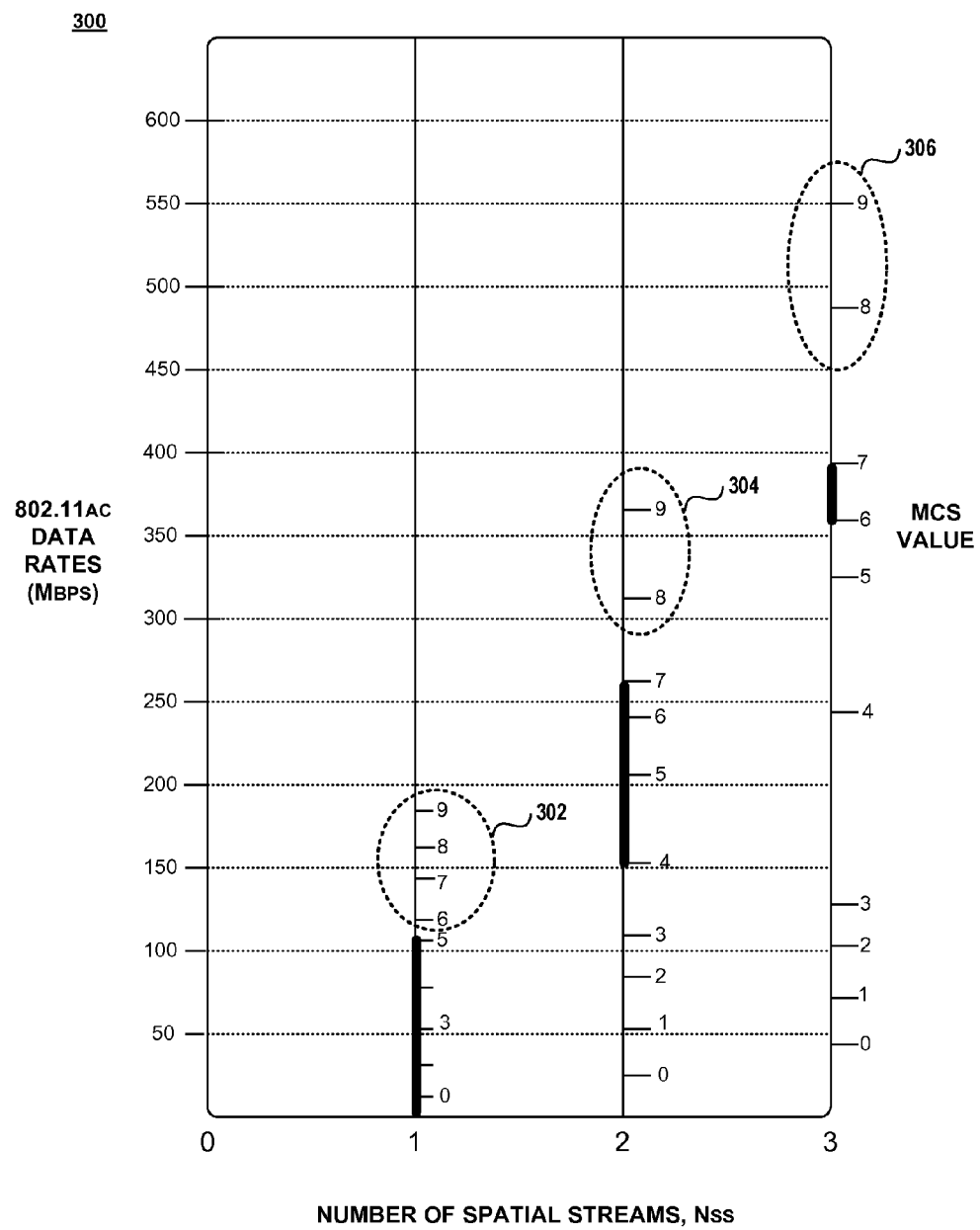
FIG. 3 is a graph illustrating exemplary alternative candidate data rates.

In the event of a failure at either probing dimension (e.g., spatial stream or MCS index), candidate data rates, those outside of the data rate table, are dynamically probed to determine a possible cause of the failure and extent of the problem. This information is then used to determine an appropriate course of action. Turning to FIG. 3, the candidate data rates are shown in the circular regions 302, 304, 306. The candidate data rates are higher rates than the pre-selected data rates in the linear rate table. As shown in FIG. 3, region 302 shows pairs (1,6), (1,7), (1,8), and (1,9), region 304 shows pairs (2,8), (2,9), and region 306 shows pairs (3,8), (3,9). The dynamic probing technique considers these candidate data rates when probing gets stuck in either dimension.

Attention now turns to a discussion on the operations for the embodiments with reference to exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., program instructions, firmware) for execution by a logic device (e.g., a radio unit or specific-purpose processor).

Figure 4:
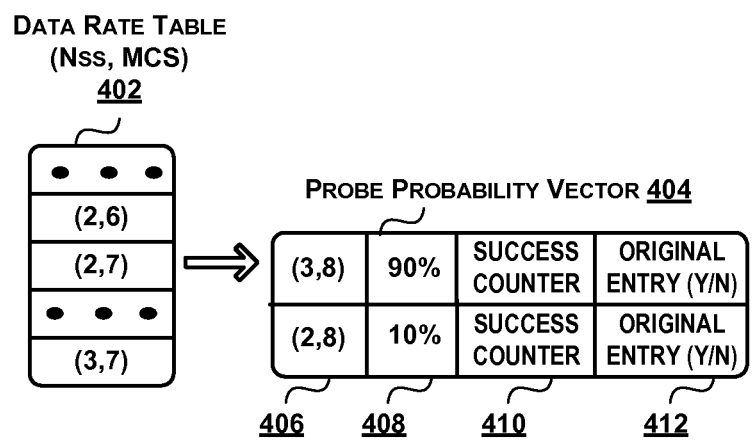
FIG. 4 is a block diagram illustrating an exemplary data rate table having a probe probability vector.

The methods discussed herein utilize a data rate table. FIG. 4 illustrates an exemplary data rate table 402. The data rate table 402 may have multiple entries, where each entry contains a candidate data rate as a pair in the format (number of spatial streams/Nss, MCS value). Each entry in the data rate table is associated with a probe probability vector (PPV) 404. A probe probability vector 404 contains one or more candidate data rates 406, each of which is associated with a probability of success 408 (e.g., 90%/10%), a success counter 410 indicating the number of probed transmissions made during dynamic probing that were successful, and an original entry indicator 412 indicating whether the candidate data rate was in the original data rate table. The candidate data rates are selected as the most likely data rates to succeed in the event of data rate probing.

Figure 5:
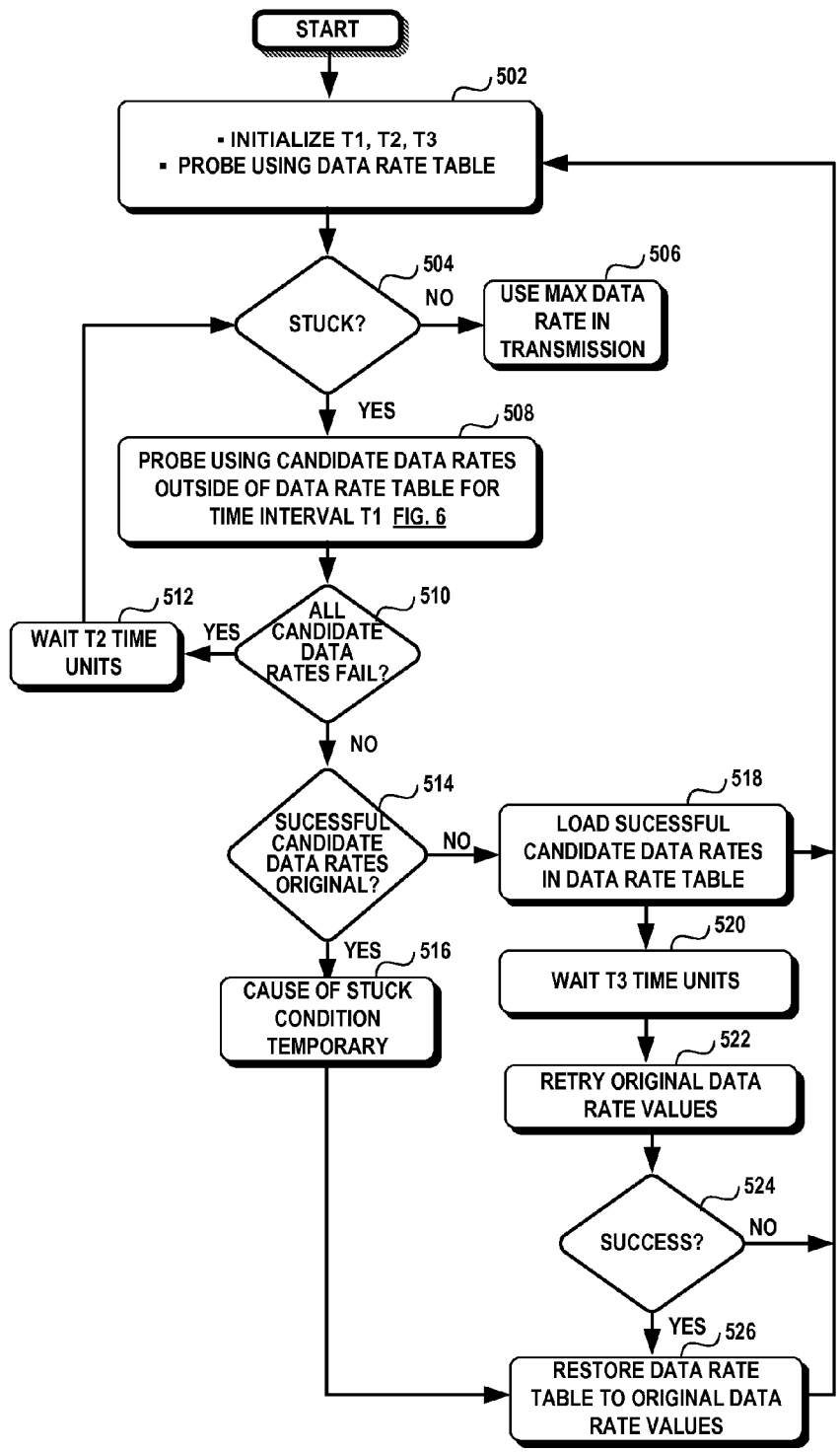
FIG. 5 is a flow diagram illustrating a first embodiment of an exemplary dynamic rate probing technique.

FIG. 5 illustrates an exemplary method 500 for performing dynamic rate control. It should be noted that the method shown in FIG. 5 may be representative of some or all of the operations executed by one or more embodiments described herein and that the method can include more or less operations than that which is described.

Initially, time intervals T1, T2, and T3 are set to initial values (block 502). T1 is the time allotted for performing dynamic rate probing. T2 is the time interval for waiting for a channel condition to clear when all candidate data rates fail. T3 is the time interval to wait until dynamic rate probing is retried with the original data rates due to a temporary condition. In one or more embodiments, the values of T1, T2, and T3 are user-defined variables which can be selected such that T3>T2>T1, where T1<10 seconds, T2<10*T2, and T3<100*T2.

The technique proceeds to transmit probe packets or probe transmissions using the data rates from the data rate table to determine the maximum data rate possible in light of the current channel conditions (block 502). The probe packet contains a MCS index value which corresponds to the data rate associated with the number of spatial streams, Nss, and MCS type used in the data rate table. There is a mapping from the Nss and MCS values found in the data rate table to the corresponding MCS index value used in the probe packet.

If the maximum data rate is achieved and probing is not stuck (block 504—no), then the maximum data rate is used for the transmission (block 506). For example, probing may be deemed stuck when no ACK message is received at a particular data rate and/or the packet error rate (PER) exceeds a 50% threshold. If probing is stuck (block 504—yes), then dynamic rate probing is performed (block 508).

In dynamic rate probing, the candidate data rates, outside of the data rate table, are used in probe packets during time interval, T1 (block 508). If probing using all the candidate data rate values fail (block 510—yes), then the dynamic probing process is terminated and the original data rate table remains intact. When probing of all the candidate data rates results in failure, the cause may be attributable to a link budget issue. In this case, dynamic rate probing is re-tried after T2 time units (block 512) when the stuck condition still sustains then.

If there are successful candidate data rates from the original data rate table (blocks 510—no, 514—yes), then this is related to the Case Two scenario shown in FIG. 2. In this case, probing was stuck in the spatial stream dimension but the stuck is now relieved. Therefore, the cause of the problem must be temporary so the data rate table should be reset with its original data rates (block 516, block 526). Afterwards, the data rate probing with the original pre-selected data rates is retried (block 502).

If there are successful candidate data rates and the successful candidate data rates were not contained in the original data rate table (blocks 510—no, 514—no), then the successful candidate data rates are loaded into the data rate table (block 518). This situation suggests that this stuck case is caused by a semi-permanent device configuration or misplaced errors. For example, if a successful candidate data rate has Nss=2 and Nss from the original data rate table had Nss=3 which failed, then the device may have been inadvertently configured as a 3×3 device when the device is actually only capable of operating as a 2×2 device. In this situation, the data rate table is reloaded with successful data rates for 2×2 devices (e.g., data rates associated with MCS index values (2,8) and (2,9) in the example of FIG. 3). Since this error is semi-permanent, then the process waits T3 time units (block 520) to retry the failed data rates from the original data rate table (block 522). If the original data rates succeed (block 524—yes), then the semi-permanent condition may have resolved itself and the original data rates are restored back to the data rate table (block 526). Otherwise, if the original data rates do not succeed (block 524—no), then the current data rate table remains intact.

Figure 6:
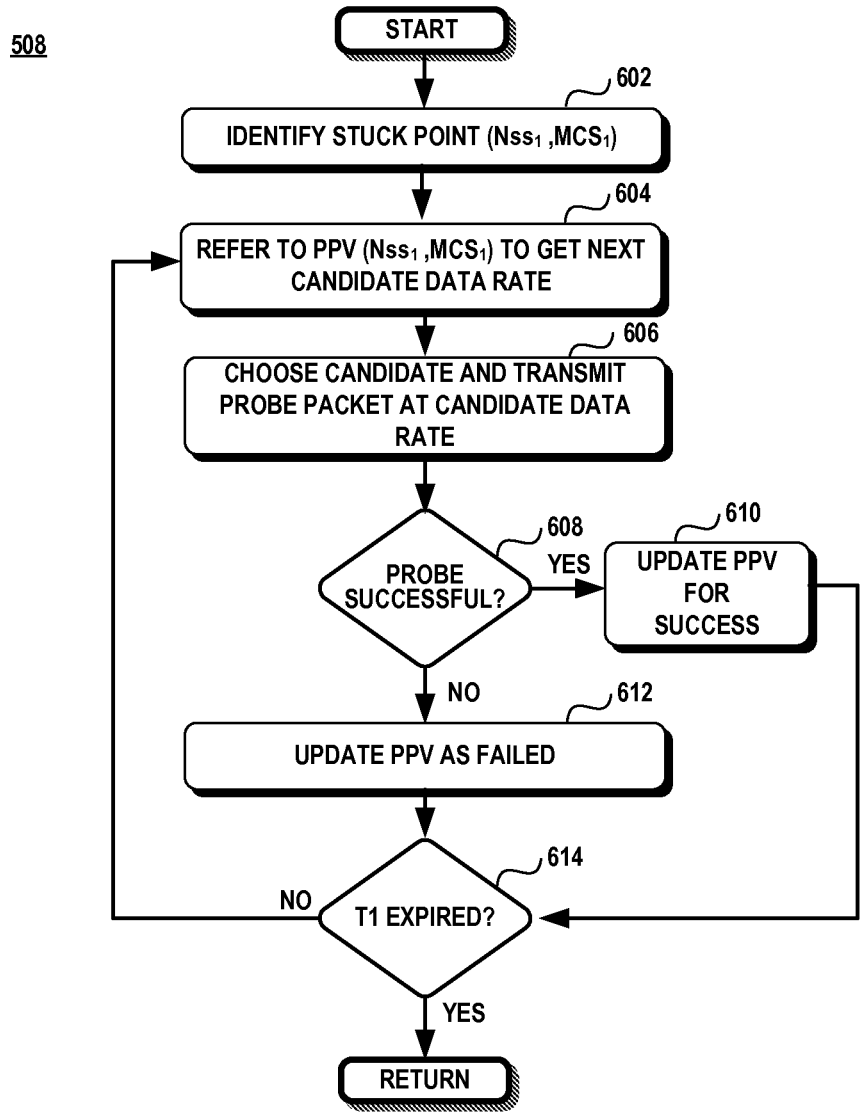
FIG. 6 is a flow diagram illustrating a second embodiment of an exemplary dynamic rate probing technique.

FIG. 6 illustrates an exemplary method 508 for performing dynamic rate control. It should be noted that the method shown in FIG. 6 may be representative of some or all of the operations executed by one or more embodiments described herein and that the method can include more or less operations than that which is described.

The data rate at which the probing is stuck is identified by the pair ($Nss_1$, $MCS_1$) (block 602). The associated probe probability vector for this pair is obtained for possible candidate data rates. There may be more than one candidate data rate. The candidate data rate with the highest probability is chosen and a probe packet is transmitted using the candidate data rate (block 606). The probe packet uses a MCS index value. There is a mapping from the combination of the Nss and MCS values in the PPV to a corresponding MCS index value that is used in the probe packet.

If the probe is successful (block 608—yes), then the probe probability vector (PPV) is updated (block 610). The probability in the PPV of the successful candidate rate is updated with $P_{old}+\lambda 1$ and the success counter in the PPV is incremented. If the candidate data rate fails (block 608—no), then the probe probability vector is updated to $[P_{old}-\lambda 2]$ and the success counter in the PPV is not incremented (block 612). The selection process repeats (block 614—no) until the time limit T1 expires (block 614—yes). By doing this, if a candidate rate is successful once, it will have a better chance to be selected in the future. Similarly, if a candidate fails once, it will have less chance to be selected in the future.

Figure 7:
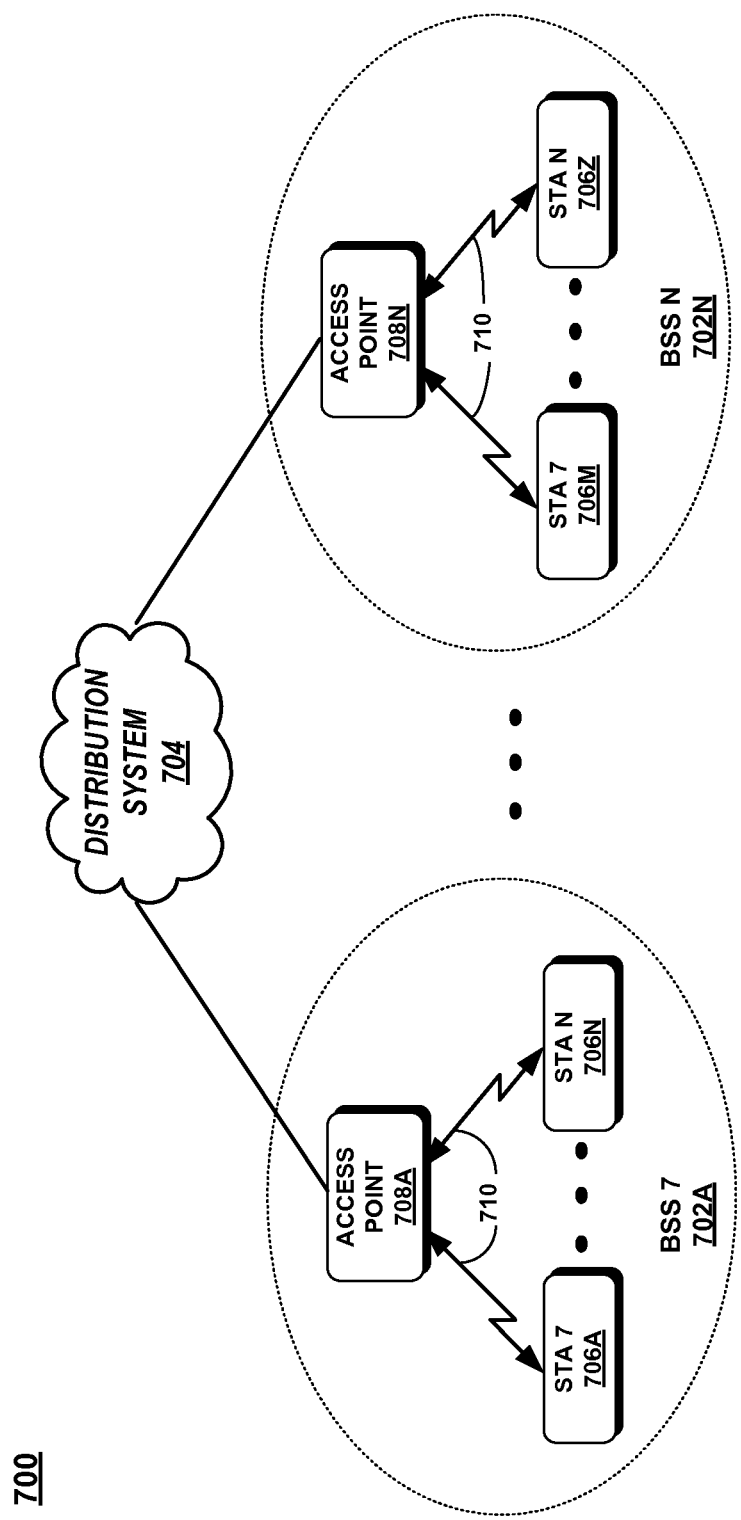
FIG. 7 is a block diagram illustrating an exemplary wireless network embodying the dynamic rate probing technique.

Attention now turns to a general discussion of an operating environment utilizing dynamic probing for rate control. FIG. 7 illustrates a block diagram of an exemplary wireless local area network (WLAN) 700 configured to implement an IEEE 802.11 communication protocol. The network 700 may be configured with one or more basic service sets (BSSs) 702A, 702N (collectively, "702") coupled to a distribution system 704. Each BSS 702A, 702N may include several stations (STAS) 706A-706Z (collectively, "706") and an access point (AP) 708A, 708N communicatively coupled wirelessly through a wireless medium 710. An access point is a station operating as a coordinator of the BSS. A station within the BSS may communicate with other stations within the BSS. A BSS may be configured as an independent BSS where stations communicate with other stations within direct communication range of each other. Alternatively, a BSS may be configured as an infrastructure BSS where all communications are relayed through an access point. The distribution system 704 provides the communication means for an access point to communicate with other access points in order to deliver frames for a station within its respective BSS. The distribution system 704 may be a wired network or a dedicated device that serves as a bridge to a backbone network.

Each station, including an access point, operates in accordance with the IEEE 802.11 protocol. The IEEE 802.11 protocol includes a Media Access Control (MAC) layer and a physical layer (PHY). The MAC layer manages and maintains communications between the stations in a wireless network by coordinating access to the shared channel. The PHY layer defines the transmission techniques used to transmit data through the wireless medium. The MAC layer performs the functions of carrier sensing and transmission and receipt of frames. The MAC layer passes frames to the PHY layer for transmission on the physical wireless media. The frames passed to the PHY layer specify a data rate for transmission, such as the data rate discussed in the embodiments presented herein.

Attention now turns to a discussion of exemplary wireless devices configured to operate within an IEEE 802.11 wireless network using the technology described herein. Various embodiments of the wireless device may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Figure 8A:
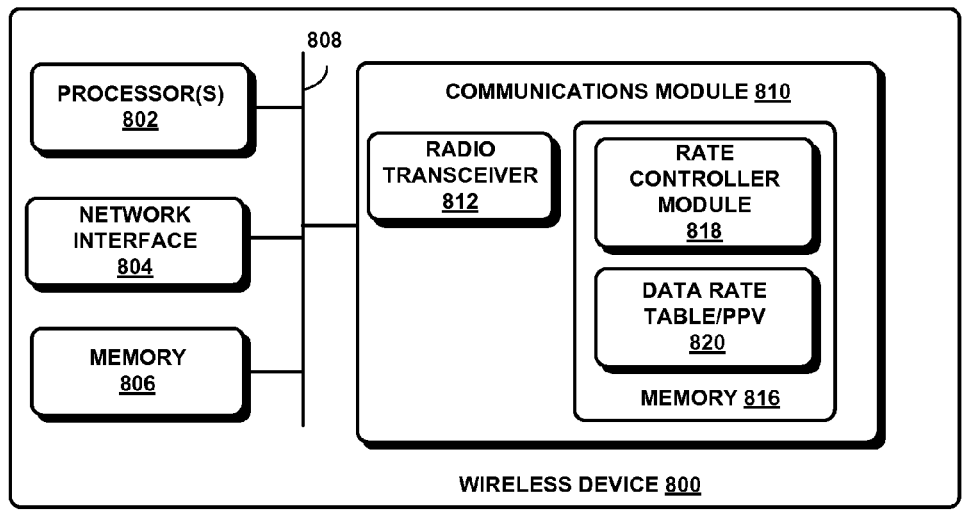
FIGS. 8A-8B are block diagrams illustrating exemplary wireless devices operating in accordance with the embodiments.

Turning to FIG. 8A, there is shown a block diagram of a first embodiment of an exemplary wireless device 800. The wireless device 800 may be any type of electronic device capable of receiving wireless signals such as, without limitation, a mobile device, a personal digital assistant, a mobile computing device, a tablet, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof. In one or more embodiments, the wireless device 800 is a WLAN device capable of operating in accordance with an IEEE 802.11 specification, such as an access point or station shown in FIG. 7.

The wireless device 800 may include at least one or more processors 802, a network interface 804, a memory 806, and a communications module 810 communicatively coupled through a communications link 808 (e.g., bus). A processor 802 may be any commercially available processor and may include dual microprocessors and multi-processor architectures. The network interface 804 facilitates wired and/or wireless communications between the wireless device 800 and a communications framework. The network interface 804 includes at least one wireless network interface (e.g., WLAN interface, a Bluetooth® interface, a WiMAX interface, and ZigBee® interface, a Wireless USB interface, etc.).

The communications module 810 may include a radio transceiver 812 and a memory 816. The memory 816 may include a rate controller module 818 and a data rate table including probe probability vectors (PPV) 820. The radio transceiver 812 comprises a packet and a data processing unit for executing instructions that receives and transmits packets in accordance with the IEEE 802.11 radio protocol. The rate controller module 818 performs the embodiments described herein. The data rate table/PPV 820 is described herein with respect to FIGS. 4-6.

The memories 806, 816 may be any machine-readable storage media that may store executable procedures, applications, and data. The machine-readable storage media pertains to non-transitory signals and not to propagated signals, such as modulated data signals transmitted through a carrier wave. Examples of a storage medium may include one or more types of machine-readable storage media capable of storing electronic data, including volatile memory or non-volatile memory, removable or non-removable memory, erasable or non-erasable memory, writeable or re-writeable memory, random access memory, read-only memory, magnetic storage, optical storage, DVD, CD, floppy disk drive, and the like. The memories 806, 816 may also include one or more external storage devices or remotely located storage devices.

The machine-readable storage media may store various software elements, such as programs, procedures, module, applications, code segments, program stacks, middleware, firmware, methods, routines, and so on. In an embodiment, for example, a machine-readable storage medium may store executable program instructions that, when executed by a processor, cause the processor to perform methods and/or operations in accordance with the described embodiments. The executable program instructions may be implemented according to a predefined computer language, manner or syntax, for instructing a computer to perform a certain function. The instructions may be implemented using any suitable high-level, low-level, object-oriented, visual, compiled and/or interpreted programming language. The rate controller module 818 and data rate table/PPV 820 may be implemented as software elements.

Figure 8B:
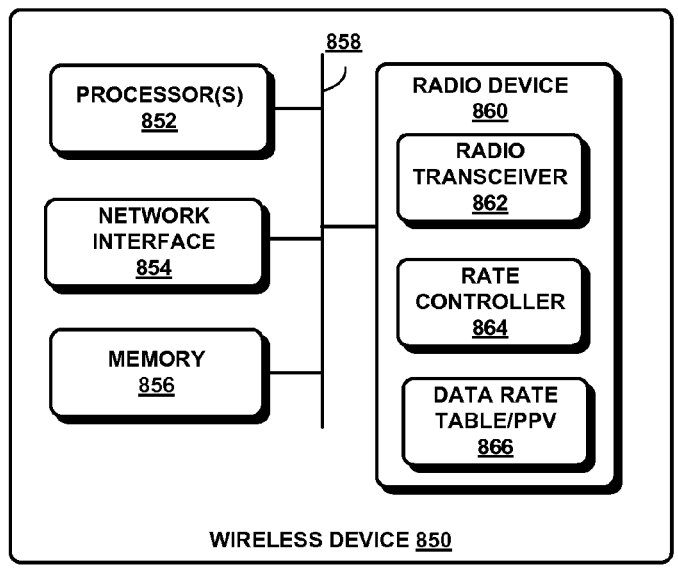

Turning to FIG. 8B, there is shown a block diagram of a second embodiment of an exemplary wireless device 850. The wireless device 850 may be any type of electronic device capable of receiving wireless signals such as, without limitation, a mobile device, a personal digital assistant, a mobile computing device, a tablet, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof. In one or more embodiments, the wireless device 850 is a WLAN device capable of operating in accordance with an IEEE 802.11 specification, such as an access point or station shown in FIG. 7.

The wireless device 850 may include at least one or more processors 852, a network interface 854, a memory 856, and a radio device 860 communicatively coupled through a communications link 858 (e.g., bus). A processor 852 may be any commercially available processor and may include dual microprocessors and multi-processor architectures. The network interface 854 facilitates wired and/or wireless communications between the wireless device 850 and a communications framework. The network interface 854 includes at least one wireless network interface (e.g., WLAN interface, a Bluetooth® interface, a WiMAX interface, and ZigBee® interface, a Wireless USB interface, etc.).

The radio device 860 may include a radio transceiver 862, a rate controller 864, and a data rate table including probe probability vectors 866. The radio transceiver 862 comprises a packet and a data processing unit for executing instructions that receives and transmits packets in accordance with the IEEE 802.11 radio protocol. The rate controller 864 performs the embodiments described herein with respect to the dynamic rate probing. The data rate table/PPV 866 is herein described with respect to FIGS. 4-6. The rate controller 864 and the data rate table/PPV 866 may include embodied in hardware elements, such as devices, components, processors, microprocessors, circuits, circuit elements, integrated circuits, application specific integrated circuits, programmable logic devices, digital signal processors, field programmable gate arrays, memory units, logic gates and so forth.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for dynamic rate adaption in a wireless network, the method comprising:
    storing a plurality of pre-selected data rates for use in transmitting data in the wireless network, each pre-selected data rate associated with a number of spatial streams (Nss) and a modulating and coding (MCS) type, the pre-selected data rates being a subset of all data rates supported by the wireless network;
    performing one or more probe transmissions to detect a maximum achievable data rate using the plurality of pre-selected data rates;
    determining that the maximum achievable data rate does not meet a threshold criterion based at least in part on the one or more probe transmissions; wherein the threshold criterion is based at least in part on a member of the group consisting of: a packet error rate associated with the maximum achievable data rate and an acknowledgment status of the one or more probe transmissions;
    performing a probe transmission using a candidate data rate, the candidate data rate associated with a Nss and MCS type, wherein the MCS type associated with the candidate data rate is different from a set of MCS types associated with members of the plurality of pre-selected data rates assigned to a same Nss as the Nss associated with the candidate data rate; and
    adding the candidate data rate to the plurality of pre-selected data rates based at least in part on whether the candidate data rate meets the threshold criterion during the probe transmission.

2. The method of claim 1, wherein performing the probe transmission using the candidate data rate comprises performing a plurality of probe transmissions using a plurality of candidate data rates, the method further comprising:
    if all candidate data rates fail to meet the threshold criterion during the plurality of probe transmissions, maintaining the set of pre-selected data rates unmodified.

3. The method of claim 2, further comprising:
    after waiting a time interval, performing one or more additional probe transmissions from the plurality of candidate data rates.

4. The method of claim 1, further comprising:
    after waiting a time interval, performing additional probe transmissions using the pre-selected data rates; and
    if at least one of the pre-selected data rates meets the threshold criterion, returning to performing probe transmissions using the pre-selected data rates.

5. The method of claim 1, wherein performing the probe transmission using the candidate data rate further comprises:
    associating a probe probability vector with each pre-selected data rate, the probe probability vector including one or more candidate data rates, each candidate data rate including a probability of success; and
    selecting the candidate data rate based, at least in part, on a highest probability of success.

6. The method of claim 5, further comprising:
    updating the probe probability vector based, at least in part, on a success or failure of the candidate data rate meeting the threshold criterion in the probe transmission.

7. The method of claim 1, wherein the pre-selected data rates are based, at least in part, on offline simulations.

8. A non-transitory machine-readable storage medium storing code for wireless communication at a wireless device, the code comprising instructions executable to cause the wireless device to:
    store a plurality of pre-selected data rates for use in transmitting data in a wireless network, the pre-selected data rates being a subset of data rates supported by the wireless network, each pre-selected data rate associated with a number of spatial streams (Nss) and a modulation and coding scheme (MCS) type; and
    perform one or more probe transmissions to detect a maximum achievable data rate from the pre-selected data rates;
    determine that the maximum achievable data rate does not meet a threshold criterion based at least in part on the one or more probe transmissions; wherein the threshold criterion is based at least in part on a member of the group consisting of: a packet error rate associated with the maximum achievable data rate and an acknowledgment status of the one or more probe transmissions;
    perform a probe transmission using a candidate data rate associated with a Nss and MCS type, wherein the MCS type associated with the candidate data rate is different from a set of MCS types associated with members of the plurality of pre-selected data rates assigned to a same Nss as the Nss associated with the candidate data rate; and
    add the candidate data rate to the plurality of pre-selected data rates based at least in part on whether the candidate data rate meets the threshold criterion during the probe transmission.

9. The non-transitory machine-readable storage medium of claim 8, wherein performing the probe transmission using the candidate data rate comprises performing a plurality of probe transmissions using a plurality of candidate data rates, and wherein the instructions are further executed to cause the wireless device to:
    if all candidate data rates fail to meet the threshold criterion during the plurality of probe transmissions, wait a time period before performing one or more additional probe transmissions using one or more of the plurality of candidate data rates.

10. The non-transitory machine-readable storage medium of claim 8, wherein the instructions are further executable to cause the wireless device to:

if at least one of the pre-selected data rates meets the threshold criterion, returning to performing probe transmissions with the pre-selected data rates.

11. The non-transitory machine-readable storage medium of claim 8, wherein the instructions are further executable to cause the wireless device to:
associate each pre-selected data rate with a probe probability vector (PPV), the PPV including one or more candidate data rates, each candidate data rate including a probability of success, the probability of success based at least in part on a success or failure of candidate data rates meeting the threshold criterion during probe transmissions.

12. The non-transitory machine-readable storage medium of claim 11, wherein the instructions are further executable to cause the wireless device to:
select the candidate data rate based at least in part on the probability of success associated with the candidate data rate.

13. The non-transitory machine-readable storage medium of claim 8, wherein each candidate data rate is configured to increase a select one of the Nss or MCS type associated with the pre-selected data rate.

14. A wireless device, comprising:
a radio transceiver to receive and transmit data via a wireless network; and a rate controller to determine a maximum achievable data rate for transmission of the data, the rate controller configured to:
store a plurality of pre-selected data rates for use in transmitting data in the wireless network, each pre-selected data rate associated with a number of spatial streams (Nss) and a modulation and coding (MCS) type, the pre-selected data rates being a subset of all data rates supported by the wireless network;
perform one or more probe transmissions to detect a maximum achievable data rate from the plurality of pre-selected data rates;
determine that the maximum achievable data rate does not meet a threshold criterion based at least in part on the one or more probe transmissions; wherein the threshold criterion is based at least in part on a member of the group consisting of: a packet error rate associated with the maximum achievable data rate and an acknowledgment status of the one or more probe transmissions;
perform a probe transmission using a candidate data rate associated with a Nss and MCS type, wherein the MCS type associated with the data rate is different from a set of MCS types assigned to a same Nss as the Nss associated with the candidate data rate; and
add the candidate data rate to the plurality of pre-selected data rates based at least in part on whether the candidate data rate meets the threshold criterion during the probe transmission.

15. The wireless device of claim 14, wherein performing the probe transmission using the candidate data rate comprises performing a plurality of probe transmissions using a plurality of candidate data rates, and wherein the rate controller is further configured to:
if the candidate data rates fail the threshold criterion, wait a time period before performing one or more additional probe transmissions using one or more of the candidate data rates.

16. The wireless device of claim 14, wherein the rate controller is further configured to:
if a pre-selected data rate meets the threshold criterion, return to performing probe transmissions with the pre-selected data rates.

17. The wireless device of claim 14, wherein the rate controller is further configured to:
associate each pre-selected data rate with a probe probability vector (PPV), the PPV including one or more candidate data rates, each candidate data rate including a probability of success, the probability of success based at least in part on a success or failure of candidate data rates meeting the threshold criterion during probe transmissions.

18. The wireless device of claim 14, wherein the rate controller is further configured to:
select the candidate data rate based on a highest probability of success associated with the candidate data rate.

* * * * *